United States Patent [19]

Lee et al.

[11] Patent Number: 4,900,761

[45] Date of Patent: Feb. 13, 1990

[54] PRODUCTION OF POLYIMIDE FOAMS

[75] Inventors: Raymond Lee, Elk Grove Village; Michael D. O'Donnell, Batavia, both of Ill.

[73] Assignee: IMI-Tech Corporation, Elk Grove Village, Ill.

[21] Appl. No.: 292,509

[22] Filed: Dec. 30, 1988

[51] Int. Cl.$^4$ .................................................. C08V 9/02
[52] U.S. Cl. .................................... 521/184; 521/183; 521/185; 521/189
[58] Field of Search ................. 521/183, 184, 185, 189

[56] References Cited

U.S. PATENT DOCUMENTS

| Re. 30,213 | 2/1980 | Gagliami et al. | 521/185 |
|---|---|---|---|
| 4,241,193 | 12/1980 | Gagliami | 521/77 |
| 4,394,464 | 7/1983 | Gogliam et al. | 521/180 |
| 4,518,717 | 5/1985 | Long et al. | 521/109 |

Primary Examiner—Morton Foelak
Attorney, Agent, or Firm—Richard J. Hammond; John F. Sieberth

[57] ABSTRACT

A polyimide precursor mixture having a solids content of about 50 to about 77 (preferably about 65 to about 75) weight percent is subjected to a multistaged thermal treatment in which the precursor is heated to one or more temperatures sufficient to obtain a consolidated but friable cellular foam structure, and the resultant cellular foam structure is then subjected to one or more higher temperatures sufficient to cure the cellular material into a resilient polyimide foam. There is no need for use of time-consuming and expensive spray drying and microwave radiation apparatus.

19 Claims, No Drawings

PRODUCTION OF POLYIMIDE FOAMS

TECHNICAL FIELD

This invention relates to a new and useful process for the production of polyimide foams.

BACKGROUND

Historically there have been three general ways by which it was possible to produce satisfactory polyimide foams. According to the process described in Lavin et al U.S. Pat. No. 3,554,939, granted in January 1971, a monomer mixture composed of an ester of benzophenone tetracarboxylic acid and an aromatic polyamine in which the mixture has a volatile content of at least 9% is heated to a temperature at which foaming occurs contemporaneously with the polymerization of the ester and polyamine components until the polyimide foam is formed.

In another procedure exemplified by that described by Gagliani in Final Report NAS 9-14718 entitled "Fire Resistant Resilient Foams" dated February 1976, a mixture of diamines is added to an alcoholic solution of the half ester of benzophenone tetracarboxylic acid and reacted at 158°–167° F. (70°–75° C.) to form a heavy syrup which is heated in a circulating air oven at 180° F. (82.2° C.) for about 12–16 hours followed by drying in a vacuum oven at 176°–194° F. (80°–90° C.) for 60–90 minutes. Thereafter the polyimide precursor is pulverized into a powder which is spread over an aluminum foil on an aluminum plate and heated at 600° F. (315.6° C.) in an oven for 30 minutes to produce the foam. In a similar procedure reported by Gagliani et al in Final Report NAS 9-15050 entitled "Development of Fire-Resistant, Low Smoke Generating, Thermally Stable End Items for Aircraft and Spacecraft" dated June 1977, the dried precursor powder formed in about the same manner was subjected, inter alia, to a multi-stage technique in which the powder was placed in a pressure vessel positioned within an oven preheated at 232.2° C. (450° F.) and held at this temperature and at a reduced pressure (19.9–9.9 inches of Hg) for 15–30 minutes. The resulting foam was then postcured at 315.6° C. (600° F.) for 15–30 minutes in a circulating air oven.

The third procedure, which represented a distinct advance in the art, involves use of microwave radiation for converting the polyimide precursor into a cellular structure which normally is then subjected to final curing in a thermal oven. In actual practice the precursor is used in the form of a powder formed by spray drying an alcoholic solution of the monomers. See for example Gagliani et al U.S. Pat. Nos. 4,296,208; 4,305,796; 4,439,381; and 4,599,365; Final Report NAS 9-15050 (supra); Final Report NAS 9-15484 entitled "Development of Fire-Resistant, Low Smoke Generating, Thermally Stable End Items for Commercial Aircraft and Spacecraft Using a Basic Polyimide Resin", a report covering work conducted in the period December 1977 to April 1980; and Final Report NAS 9-16009 entitled "Formulation and Characterization of Polyimide Resilient Foams of Various Densities for Aircraft Seating Applications", a report covering work conducted in the period February 1980 to September 1981. In U.S. Pat. Nos. 4,305,796 and 4,439,381 it is indicated that the precursors may range in form from a 'liquid resin' to a spreadable, pastelike formulation depending upon the nature and quantity of any fillers added to the resin.

While highly efficacious, spray drying and microwaving operations are time consuming and involve use of expensive process apparatus. A desirable contribution to the art would be a process in which high quality foams may be produced without need for use of microwave radiation and with reduced use of drying equipment such as spray dryers or vacuum dryers. This invention is believed to represent such a contribution.

THE INVENTION

In accordance with this invention polyimide foams of good quality can be produced by subjecting a polyimide precursor mixture having a solids content of about 50 to about 77 weight percent to a multistaged thermal treatment. In at least one such stage the precursor is subjected to one or more temperatures sufficient to obtain a consolidated but friable cellular foam structure, and in at least one other such stage this cellular foam structure is subjected to one or more higher temperatures sufficient to cure the cellular material into a resilient polyimide foam. Preferably, these stages are conducted in a continuous manner as by supporting the material being foamed on a moving belt or rotating platform associated with appropriate heating apparatus maintained at suitable temperatures (e.g., one or more tunnel heaters, etc., with appropriate temperature zones along the path of travel). Alternatively, a single furnace, oven or other thermal apparatus is employed whereby the material being foamed is kept more or less in one place and the temperature applied thereto is suitably increased during the period of time the precursor, developing cellular structure and developed cellular structure are maintained in the apparatus. Any type of apparatus may be used for applying the thermal energy to the precursor, to the cellular structure as it is developing therefrom, and to the resultant developed cellular structure. Such equipment includes radiant heaters; furnaces operated on natural gas, LPG, fuel oil, etc.; dielectric heaters; microwave cavities; and the like. However use of thermal ovens (e.g., a single circulating air electric oven operated such that its temperature is appropriately increased during the residency of the material being processed therein, or two or more electric resistance heaters positioned in and along the length of a tunnel or cavity with their temperatures suitably set or regulated such that the material being conveyed therethrough encounters increased temperatures during its travel) is most preferred because of the lower capital and operating costs involved when using such apparatus. The cured polyimide foam may of course be subjected to a final postcuring at still higher temperatures if desired.

In most cases the consolidated but friable cellular foam structure is produced from the precursor at temperatures within the range of about 120° to about 180° C., and preferably in the range of about 135° to about 170° C. (about 275° to about 325° F.) and curing is effected at temperatures of at least about 220° C. (preferably at least about 230° C.). However departures from these ranges are permissible where the circumstances warrant or justify such departures. Usually temperatures above about 425° C. are not used as thermal degradation of the foam may be encountered, depending of course on the composition of the foam being processed, some foams having greater thermal stability than others.

The preferred precursors are composed of one or more esters of one or more aromatic tetracarboxylic acids, one or more primary polyamines, and one or more solvents or liquid carriers (diluents) having sufficient volatility to be removable from the precursor composition on application of heat sufficient to initiate foaming. Most preferably the esters are predominantly diesters (half esters) of aromatic tetracarboxylic acids and lower alkanols such as methanol, ethanol, isopropanol, propanol, the butanols, the pentanols, the hexanols, and the like. The primary polyamines employed are preferably aromatic diamines or heterocyclic diamines, or combinations thereof, optionally with a minor proportion of one or more aliphatic diamines. The solvent or diluent is preferably a lower alkanol, most preferably the lower alkanol from which the ester was prepared (e.g., $C_1$ to $C_{10}$, preferably $C_1$ to $C_4$, most preferably $C_1$ to $C_2$). However a wide variety of other liquid materials of suitable volatility may be used for this purpose, such as unsaturated alcohols, cycloaliphatic alcohols, ketones, chlorinated hydrocarbons, aliphatic hydrocarbons, cycloaliphatic hydrocarbons, aromatic hydrocarbons, ethers, and the like.

The methyl or ethyl esters of benzophenone tetracarboxylic acid which predominate in the diesters are the most preferred aromatic esters for use in the process. The most preferred cyclic diamines for this use are 4,4'-methylenediamine, 4,4'-oxydianiline, and diaminopyridines, such as 2,6-diaminopyridine.

Any of a number of procedures may be used for forming the initial precursor composition of appropriate solids content. For example the ester and amine monomers may be mixed with a suitable solvent or liquid diluent in appropriate proportions to form the precursor directly. Similarly, a more dilute solution of the monomers may be concentrated to the desired solids content as by use of vacuum distillation at a suitably low temperature such that excessive reaction between the monomers does not occur. Generally speaking, precursor compositions with a solids content in the range of about 60 to about 77 weight percent are preferred, and those with a solids content in the range of about 65 to about 75 weight percent are particularly preferred.

Having described the basic concepts of this invention, reference is now made to the following examples which serve to still further illustrate the practice and advantages of this invention.

EXAMPLE I

To a 1.0 liter three-neck, round-bottom glass flask, equipped with a mechanical stirrer, thermometer, heating jacket, and condenser, is added 320 mL (8.0 moles) methyl alcohol, and 254 mL (1.33 moles) distilled water. The solution is thoroughly mixed and 322.23 g (1.0 mole) benzophenone tetracarboxylic acid dianhydride (BTDA) are added with stirring. This mixture is then heated to reflux to form the methyl ester of the BTDA. Once the esterification reaction is complete, the clear solution is cooled to below 40° C. and 158.6 g (0.8 mole) of methylenedianiline (MDA) are added. After the MDA has completely dissolved, 21.8 g (0.2 mole) of 2,6-diaminopyridine (DAP) are added and mixed until dissolved. This is followed by the addition of 14.0 grams (3.0 percent by weight of the polyimide solids) of a silicone glycol surfactant, Dow Corning 193. The solution is thoroughly mixed to yield a liquid polyimide resin.

Half of the liquid resin is processed into powder using a spray dryer or a vacuum dryer.

To obtain the desired solids content (70-75%) in the paste resin, the appropriate amount of powder resin (158 g) and liquid resin (198 g) were combined. The resulting paste-like resin contained 74.7 percent solids and produced a tough, flexible, resilient foam when exposed to 149° C. for 90 minutes followed by 246° C. for 60 minutes.

EXAMPLE II

Liquid resin prepared by the process described in Example I is exposed to reduced pressure at 30° C. to remove solvent (methanol and water) until the desired solids content (70-75%) is obtained. The resulting paste is then exposed to 149° C. to 90 minutes followed by 246° C. for 60 minutes to obtain a tough, flexible resilient foam.

EXAMPLE III

In a 1.0 liter three-neck, round-bottom glass flask, equpped with a high shear, high torque mechanical stirrer, thermometer, heating jacket, and a condenser, add 120 mL 93 moles) methanol and 9 mL (0.5 mole) of distilled water. The solution is thoroughly mixed and 322.23 g (1.0 mole) BTDA are added with stirring. This mixture is then heated to reflux to form the methyl ester of BTDA. Once the esterification reaction is complete, the clear solution is cooled to below 60° C. and 158.6 g of MDA are added. After the mDA has completely dissolved, 21.8 g of DAP are added and mixed in until dissolved. This is followed by the addition of 14 grams of Dow Corning 193 surfactant followed by thorough mixing. A paste-like resin having 70-75 percent solids is obtained. Upon exposure to 149° C. for 90 minutes followed by 246° C. for 60 minutes, a tough, flexible resilient foam is obtained.

EXAMPLE IV

A series of paste resins was prepared using the process outlined in Examples I, II and III with surfactant concentrations varying from 1.5 to 6.0 percent. The paste resins were foamed and cured as described in Examples I, II and III followed by testing and evaluation. Data obtained are summarized in the following table:

| | Foam Properties | | | |
|---|---|---|---|---|
| Percent Surfactant | Density | Resiliency | Percent Loss Compression Set | Foam Type |
| 1.5 | 0.58 | 25-35 | 30.8 | No skin, fine homogeneous cell structure, some striations and holes, flexible and resilient. |
| 2.0 | 0.39 | 20-25 | 31.7 | Very little skin, medium-to-fine cell structure, some striations, flexible and resilient. |
| 3.0 | 0.59 | 30-35 | 22.5 | Very little skin, medium-to-coarse filmy cell structure flexible and resilient, but very slightly brittle. |

| Percent Surfactant | Density | Resiliency | Foam Properties Percent Loss Compression Set | Foam Type |
| --- | --- | --- | --- | --- |
| 6.0 | 0.41 | 30–40 | 26.8 | Very little skin, medium-to-coarse filmy cell structure, flexible and resilient, but slightly brittle. |

EXAMPLE V

A series of paste resins was prepared using the processed outlined in Examples I, II and III with solids concentrations of 70, 72.5, 75, 77.5, and 80 percent. The paste resins were foamed and cured as described in Examples I, II and III followed by testing and evaluation. Data obtained are summarized in the following tables:

| % Solids | Paste Type | Viscosity (CPS) | Foam Properties Foam Density | Resiliency | Compression Set (% Loss) | Foam Type |
| --- | --- | --- | --- | --- | --- | --- |
| 70.0 | Thick, sticky paste | 1,120,000 to 1,440,000 | 0.39 | 20–25 | 31.7 | Very little skin, medium-to-fine cell structure, some striations, flexible, and resilient. |
| 72.5 | Very thick paste, very little sticking | Greater than 20,000,000 | 0.80 | 40–45 | 21.6 | Very little skin, fine, tight homogeneous structure, some striations. |
| 75.0 | Very thick, taffy-like paste; no sticking | Greater than 20,000,000 | 0.58 | 25–35 | 30.8 | No skin, fine homogeneous cell structure, some striations and holes. |
| 77.5 | Powder content too high, hetrogeneous | NM | 1.01 | 30–40 | 29.6 | Incomplete foaming, only 80% of expected size, moderate amount of skin, tight cell structure, several striations. |
| 80.0 | Powder | NA | 1.06 | 45–55 | 21.6 | Poor foaming, only 50% of expected size, large amount of thick skin, in several areas the powder dried out before foaming, some striations, holes, cavities. | x = Viscosity exceeded range of equipment.
NM = Not measurable.
NA = Not applicable, not a paste.

EXAMPLE VI

A paste resin, having a solids content of 70 percent and a surfactant concentration of 2.0 percent was prepared using the methods described in Examples I and II. Several 60 gram portions were taken and placed into five aluminum foil lined metal molds having an internal capacity of 0.195 cubic feet (0.00552 cubic meters). Each mold was foamed at various temperatures (i.e., 121°, 135°, 149°, 163°, and 177° C.) for 60 minutes. After foaming, the mold was then raised to 260° C. and held for one hour, after which the mold was cooled and the foam removed followed by testing and evaluation. Data obtained are summarized in the following table:

| Foaming Temperature (°C.) | Density (pcf) | Resiliency | Foam Properties Compression Set (% Loss) | Foam Type |
| --- | --- | --- | --- | --- |
| 93 | — | — | — | Poor foam, uneven rise, resin dried out during low temperature, then foamed during higher temperature. |
| 121 | 0.31 | 30–35 | 36.1 | Almost no skin, good cellular structure, some striations, cell size in center is coarser becoming finer towards the outer edge, flexible, resilient. |
| 135 | 0.32 | 30–35 | 24.8 | Almost no skin, ¼" in from outer most skin is a second skin layer, homogeneous cellular structure, flexible, resilient, few striations. |
| 149 | 0.32 | 30–40 | 16.6 | Almost no skin, secondary skin layer ⅜" in from outer edge, homogeneous cellular structure, flexible, resilient, few striations. |
| 163 | 0.33 | 25–35 | 26.7 | Almost no skin, secondary skin layer ½" in from outer edge, homogeneous cellular structure, flexible, resilient few striations. |

-continued

| Foaming Temperature (°C.) | Density (pcf) | Foam Properties | | Foam Type |
|---|---|---|---|---|
| | | Resiliency | Compression Set (% Loss) | |
| 260 | 0.41 | 25–35 | 27.8 | Almost no skin, secondary skin layer ⅛ - ¾" in from outer edge, several striations, flexible resilient. |

EXAMPLE VII

A paste resin, having a solids content of 65–70 percent and a surfactant concentration of 4.0 percent was prepared using the method described in Example II was mixed with varying amounts of carbon fibers, ranging in concentration from 0.5–50 percent. These filled resins were then foamed and cured as described in Example VII to obtain a series of reinforced foams. It was found that as the concentration of fiber increased the density of the foam increased and the foam became more rigid.

As can be seen from the foregoing, the polyimide precursors used in the practice of this invention are composed of a mixture comprising at least (i) one or more organic tetracarboxylic acids or derivatives thereof, (ii) one or more organic diamines co-reactive therewith, and (iii) a suitable liquid solvent or diluent. Preferably the diamines include at least one aromatic or aromatic heterocyclic primary diamine. Components (i) and (ii) are usually present in the mixture in essentially stoichiometric (substantially equal molar) quantities. Most preferably, such precursor compositions further include a suitable quantity of a surfactant, most preferably a silicone glycol surfactant.

The organic tetracarboxylic acids or derivatives thereof are preferably based on aromatic tetracarboxylic acids having the general formula:

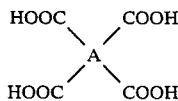

wherein A is a tetravalent organic group preferably an aromatic group. The tetravalent organic group A is most preferably an aromatic group having one of the following structures:

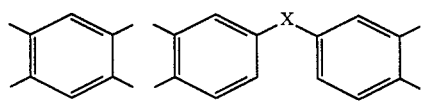

wherein X is one or more of the following:

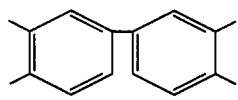

although other aromatic groups are suitable. The derivatives which may be employed include acid halides, esters, and the like. Of these, esters are preferred and are most generally used for foam production.

Preferred among the tetracarboxylic acid esters are the alkyl esters of 3,3',4,4'-benzophenone tetracarboxylic acid, most preferably the lower alkyl diesters thereof. Mixtures of two or more aromatic esters, most preferably predominating in diesters, may be employed, if desired.

It is also possible, in accordance with this invention, that the tetracarboxylic acid derivative employed in the manufacture of the polyimide foams be a caprolactam as taught by U.S. Pat. Nos. 4,161,477, 4,183,838 and 4,183,839, the disclosures of which are incorporated herein by reference. As described in those patents, bisimide is formed by reaction of a tetracarboxylic acid dianhydride with an oxoimine such as caprolactam and then reacted with the diamine or diamines to produce the desired polyimides. The caprolactam is displaced during the reaction, in much the same way as is the ester portion of the tetracarboxylic acid ester.

The tetracarboxylic acid derivative used in the manufacture of the initial polyimide foams employed in the practice of this invention may also be an N-substituted imido acid ester of the tetracarboxylic acid as taught by U.S. Pat. Nos. 4,647,597 and 4,656,198, the disclosures of which are incorporated herein by reference. As described in those patents, the N-substituted imido acid ester may be formed by reacting an aromatic tetracarboxylic acid dianhydride with an amino acid and an alcohol or mixture of alcohols. As further taught in those patents, on reaction of the imido acid ester with the diamine or diamines, the acid ester group bonded to the nitrogen atom of the N-substituted imido acid ester is displaced so that the desired polyimide is formed.

The organic diamines with which the foregoing mixture of tetracarboxylic acids or derivatives is employed may be represented by the formula:

$$H_2-N-R'-NH_2$$

wherein R' is an aromatic group containing 5 to 16 carbon atoms and containing up to one hetero atom in the ring, the hetero atom being nitrogen, oxygen or sulfur. Also included are aromatic groups such as:

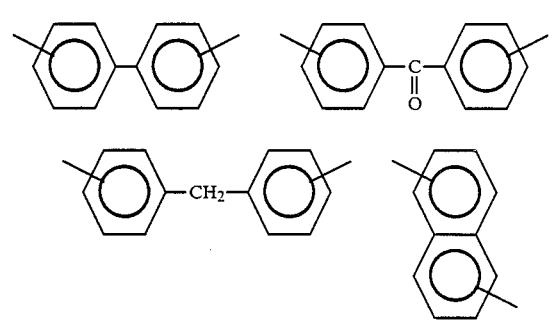

-continued

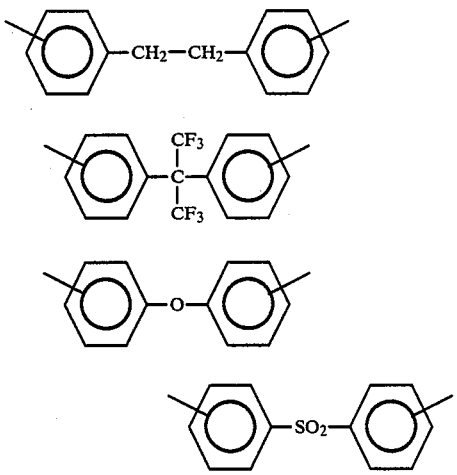

Representatives of such diamines include:
2,6-diaminopyridine;
3,5-diaminopyridine;
3,3'-diaminodiphenylsulfone;
4,4'-diaminodiphenylsulfone;
4,4'-diaminodiphenylsulfide;
3,3'-diaminodiphenylether;
4,4'-diaminodiphenylether;
meta-phenylenediamine;
para-phenylenediamine;
4,4'-methylene dianiline;
2,6-diamino toluene;
2,4-diamino toluene;
and the like.

It is also possible and sometimes desirable in the preparation of the polyimide precursors, to include in the reaction mixture one or more aliphatic diamines. Such aliphatic diamines are preferably alpha-omega diaminoalkanes having the formula:

$$H_2N-(CH_2)_n-NH_2 \qquad (I)$$

wherein n is an integer from 2 to 16. Representatives of such diamines include 1,3-diaminopropane, 1,4-diaminobutane, 1,5-diaminopentane, 1,6-diaminohexane, etc.

In place of or in addition to the foregoing aliphatic amines, use can be made of aliphatic etherified polyamines of the type polyoxypropylene amines having the formula:

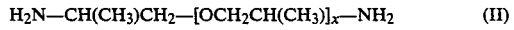
$$H_2N-CH(CH_3)CH_2-[OCH_2CH(CH_3)]_x-NH_2 \qquad (II)$$

wherein x varies from 1 to about 5 carbon atoms.

Other useful primary diamines which may be included in the foams used in the practice of this invention include amino-terminated butadiene-nitrile copolymers having the general formula:

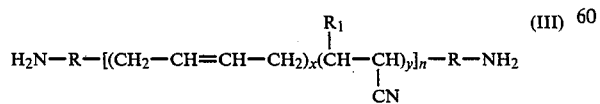

wherein R is either a phenylene group or an alkylene group, $R_1$ is hydrogen or methyl, and x and y or each independently integers ranging from 1 to 25 and n is an integer, preferably below 20. In these copolymers it is preferred that butadiene constitute at least 50% by weight of the butadiene and nitrile monomer. The nitrile monomer copolymerized with the butadiene can either be acrylonitrile or methacrylonitrile. Such copolymers generally have low molecular weights, preferably less than 3,000 to insure that they are sufficiently fluid to react in the formation of the polyimide as well as sufficiently fluid so as to be capable of foaming.

Still another type of primary diamines which may be included in the polyimide foams used in this invention is the aromatic amino-terminated silicones, such as those having the general formula:

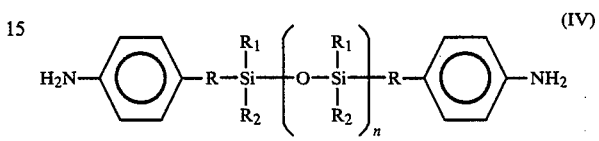

wherein R is a $C_2$ to $C_6$ alkylene group, $R_1$ and $R_2$ are each independently lower alkyl containing 1 to 3 carbon atoms and n is an integer from 1 to 4.

Another preferred category of diamines which may be utilized in forming the foams for use in this invention are the diesters of an amino-substituted aromatic carboxylic acid and a polymethylene glycol. Such diesters may be represented by the general formula:

$$H_2N-ArCOO-R-OOCAr-NH_2 \qquad (V)$$

wherein R is an alkylene group (which may be branched or straight chain) and which preferably contains from 3 to 8 carbon atoms, most preferably trimethylene; and Ar is an aromatic group which may be composed of one or more fused or non-fused benzene rings which in turn may carry suitable substituents (e.g., nitro, alkoxy, etc.) in addition to the primary amino groups.

A few exemplary diesters of this type include:
ethylene glycol-4-aminobenzoic acid diester;
ethylene glycol-3-aminobenzoic acid diester;
ethylene glycol-2-aminobenzoic acid diester;
trimethylene glycol-3-aminobenzoic acid diester;
trimethylene glycol-2-aminobenzoic acid diester;
trimethylene glycol-3-amino-2-nitrobenzoic acid diester;
tetramethylene glycol-3-amino-4-nitrobenzoic acid diester;
tetramethylene glycol-3-amino-5-nitrobenzoic acid diester;
tetramethylene glycol-4-amino-2-nitrobenzoic acid diester;
1,5-pentanediol-4-amino-3-nitrobenzoic acid diester;
1,6-hexanediol-5-amino-2-nitrobenzoic acid diester;
neopentyl glycol-4-amino-2-methylbenzoic acid diester;
1,8-octanediol-4-amino-2-propylbenzoic acid diester;
1,9-nonanediol-3-amino-4-methylbenzoic acid diester;
1,10-decanediol-4-(4-aminophenyl)benzoic acid diester;
and the like. Mixtures of such diesters may be employed.

A particularly preferred diester of this type is the diester of trimethylene glycol (1,3-propanediol) and 4-aminobenzoic acid.

In producing the initial polyimide foams, the organic tetracarboxylic acid preferably in the form of its diester, most preferably from methanol or ethanol, is reacted with the above-referred-to amine(s) to form a prepolymer in the form of a consolidated, fragile foam structure, which is then subjected to additional heating in order to effect imide formation and thereby cure the polymer. When using the tetracarboxylic acid ester this operation can be conducted either in the presence or absence of an added blowing agent to provide the desired polyimide foam.

The relative proportions used in the preparation of the polyimide and polymers can be varied. In general, it is preferred to employ essentially stoichiometric proportions as between the mixture of tetracarboxylic acids or derivatives thereof and the primary diamine(s). However, non-stoichiometric mixtures can be used although the excess of the reactant present in excess usually does not participate in the reaction.

When using a lower alkyl ester of the tetracarboxylic acid, the resulting alcohol produced in the reaction as well as the water released during the reaction can be used as the blowing agent during polymerization to form the desired polyimide foams. Alternatively, use can be made of any of a variety of organic or inorganic blowing agents. By use of a solid blowing agent such as Celogen TSH, Celogen OT, Celogen AZ 130, Celogen RA, Celogen HT 500, Celogen HT 550, sodium bicarbonate, benzenesulfonyl hydrazide, boric acid, benzoic acid, and Expandex 5 PT of controlled particle size, the homogeneity of the cellular structure of the resulting polyimide foam can be more accurately controlled. Preferred for such use are solid blowing agents which have been subjected to ball milling or other grinding so that the blowing agent is less than 200 microns in diameter, with 98 percent of the blowing agent particle sizes being less than 150 microns in diameter.

The chemical compositions of the blowing agents identified by trade name above follow:

| Blowing Agent | Chemical Composition |
| --- | --- |
| Celogen TSH | toluenesulfonyl hydrazide |
| Celogen OT | p,p,'-oxybis(benzenesulfonyl hydrazide) |
| Celogen AZ 130 | azodicarbonamide |
| Celogen RA | p-toluenesulfonyl semicarbazide |
| Celogen HT 500 | a modified hydrazine derivative |
| Celogen HT 550 | hydrazol dicarboxylate |
| Expandex 5 PT | 5-phenyltetrazole |

Variations in the concentration of the blowing agent can be used to achieve specific densities and ILD values. Concentrations of up to 10 percent based on the weight of the polyimide precursor, and preferably 1 to 5 percent, can be employed. A concentration of about 2.5 weight percent is particularly preferred.

Hydrated organic compounds of the type referred to in U.S. Pat. No. 4,621,015 may also be used as blowing agents in forming polyimide foams suitable for use in the practice of this invention.

The initial foams may contain various filler and/or reinforcing materials. For example, graphite, glass and other synthetic fibers can be added to the precursor composition to produce a fiber-reinforced product. Microballons may be added for density adjustment, if desired. It is frequently desirable to employ a surfactant thereby increasing cellular structure stability and uniformity, and increase fatigue resistance and make the foam more flexible and resilient. The nature of such surfactants for this use is well known and reported in the patent literature.

When producing foams from tetracarboxylic acids or derivatives thereof other than lower alkyl esters, a blowing agent and/or microballons should be employed in order to achieve a suitable cellular structure.

Although not necessary, for some applications it is desirable that the initial foam contain a suitable quantity of a flame retardant material in order to still further increase the flame resistance of the foam.

It will be apparent that this invention is susceptible to considerable variation in the practice without departing from the spirit and scope of the appended claims, the forms described hereinbefore being merely exemplary of its practice.

We claim:

1. A process for the production of polyimide foams which comprises subjecting a polyimide precursor mixture having a solids content of about 50 to about 75 weight percent by first heating said mixture to a foaming temperature in the range of about 135° to about 170° C. to form a consolidated but friable cellular foam structure and then subjecting said friable cellular foam structure to a temperature of at least about 230° C. to cure the cellular material into a resilient polyimide foam.

2. A process of claim 1 wherein the heating stages are conducted in a continuous manner.

3. A process of claim 2 wherein the precursor and the cellular foam structure produced therefrom are heated to increasing temperatures while contained within a thermal oven, by increasing the temperature of the oven from stage to stage.

4. A process of claim 2 wherein the precursor and the cellular foam structure produced therefrom are heated to increasing temperatures from stage to stage by moving the precursor or the foam structure being produced therefrom, or both, through a series of zones of increased temperatures.

5. A process of claim 1 wherein the polyimide precursor mixture used in the process has an initial solids content of about 65 to about 75 weight percent.

6. A process of claim 1 wherein the polyimide precursor mixture used in the process comprises the diester of at least one aromatic tetracarboxylic acid, at least one aromatic or heterocyclic primary diamine, and at least one lower alcohol.

7. A process of claim 6 wherein the lower alcohol is a $C_1$ to $C_3$ alkanol, and corresponds to the alcohol from which said ester was prepared.

8. A process of claim 6 wherein the diester is a lower alkyl ester of benzophenone tetracarboxylic acid.

9. A process of claim 6 wherein the diamine comprises 4,4'-methylenedianiline.

10. A process of claim 6 wherein the precursor mixture includes a surfactant.

11. A process of claim 6 wherein the diester is a lower alkyl ester of benzophenone tetracarboxylic acid and the diamine is predominantly or entirely 4,4'-methylenedianiline.

12. A process of claim 11 wherein the polyimide precursor mixture used in the process has an initial solids content of about 65 to about 75 weight percent.

13. A process of claim 11 wherein the precursor mixture includes a silicone glycol surfactant.

14. A process of claim 12 wherein the consolidated but friable cellular foam structure is obtained by use of one or more foaming temperatures in the range of about 135° to about 170° C. and wherein the resilient polyimide foam is produced by heating such foam structure to at least about 230° C.

15. A process of claim 6 wherein the diester is the dimethyl ester of benzophenone tetracarboxylic acid or the diethyl ester of benzophenone tetracarboxylic acid, the diamine is predominantly a mixture of 4,4'-methylenedianiline and a diaminopyridine, and the lower alcohol corresponds to the alcohol from which said ester was prepared, and wherein the precursor mixture includes a silicone glycol surfactant.

16. A process of claim 15 wherein the polyimide precursor mixture used in the process has an initial solids content of about 65 to about 75 weight percent.

17. A process of claim 16 wherein the consolidated but friable cellular foam structure is obtained by use of one or more foaming temperatures in the range of about 135° to about 170° C. and wherein the resilient polyimide foam is produced by heating such foam structure to at least about 230° C.

18. A process of claim 16 wherein the precursor and the cellular foam structure produced therefrom are heated to increasing temperatures while contained within a thermal oven, by increasing the temperature of the oven from stage to stage.

19. A process of claim 16 wherein the precursor and the cellular foam structure produced therefrom are heated to increasing temperatures from stage to stage by moving the precursor or the foam structure being produced therefrom, or both, through a series of zones of increased temperatures.

* * * * *